March 27, 1962 O. MUELLER ET AL 3,026,746
INDEXING PLATFORM
Filed Jan. 8, 1958 8 Sheets-Sheet 4

INVENTORS.
Otto Mueller
Clarence H. Miller
William M. Engelbrecht
BY
Barnes, Kiesel & Price
ATTORNEYS.

March 27, 1962  O. MUELLER ET AL  3,026,746
INDEXING PLATFORM

Filed Jan. 8, 1958  8 Sheets-Sheet 5

FIG. 5

INVENTORS.
Otto Mueller
Clarence H. Miller
William M. Engelbrecht.
BY
Harness, Dickey & Pierce
ATTORNEYS.

3,026,746
INDEXING PLATFORM

Otto Mueller, 13 Byfield Lane, Dearborn, Mich.; Clarence H. Miller, 1014 Balfour Road, Grosse Pointe, Mich.; and William M. Engelbrecht, 2434 Devon Lane, Birmingham, Mich.

Filed Jan. 8, 1958, Ser. No. 707,815
20 Claims. (Cl. 74—822)

This invention relates generally to movable supporting platforms for workpieces and more particularly to a movable platform which is automatically stopped or indexed at preselected positions of the platform.

Many manufacturing operations require a rotatable indexing platform or table for supporting the workpieces during various work operations such as drilling, machining, etc. In precision work, the platform must stop in rotation at exact predetermined positions of the workpieces so that the drill holes and the like formed in the workpieces are located with the required accuracy. Furthermore, since the stop positions of the platform of course vary for different jobs, it is desirable that the platform stop positions be readily changeable to adapt the platform for ready changing from one job to the next.

An object of this invention, therefore, is to provide an improved index platform of the above type which is automatically operable to locate workpieces thereon at predetermined exact positions.

A further object of this invention is to provide an indexing platform of the above type which includes mechanism for initially setting up the platform so that the platform is movable to a plurality of stop positions and the stop element may be at different vertical positions for each series of stop locations.

A further object of this invention is to provide an indexing platform of the above type which includes structure for forming the platform with its own movement control device so that the number of different patterns through which the platform can be moved is unlimited.

Still a further object of this invention is to provide an indexing platform of the above type which is relatively simple in construction, economical to manufacture, and efficient in operation in precisely locating parts thereon at a plurality of stop positions.

Further objects, features and advantages of this invention will become apparent from a consideration of the following description, the appended claims and the accompanying drawing in which:

FIG. 6 is a fragmentary sectional view looking substantially along the line 6—6 in FIG. 2;

FIGS. 8 and 9 are sectional views looking substantially along the line 8—8 and 9—9, respectively, in FIG. 7.

Figures 1, 1A:
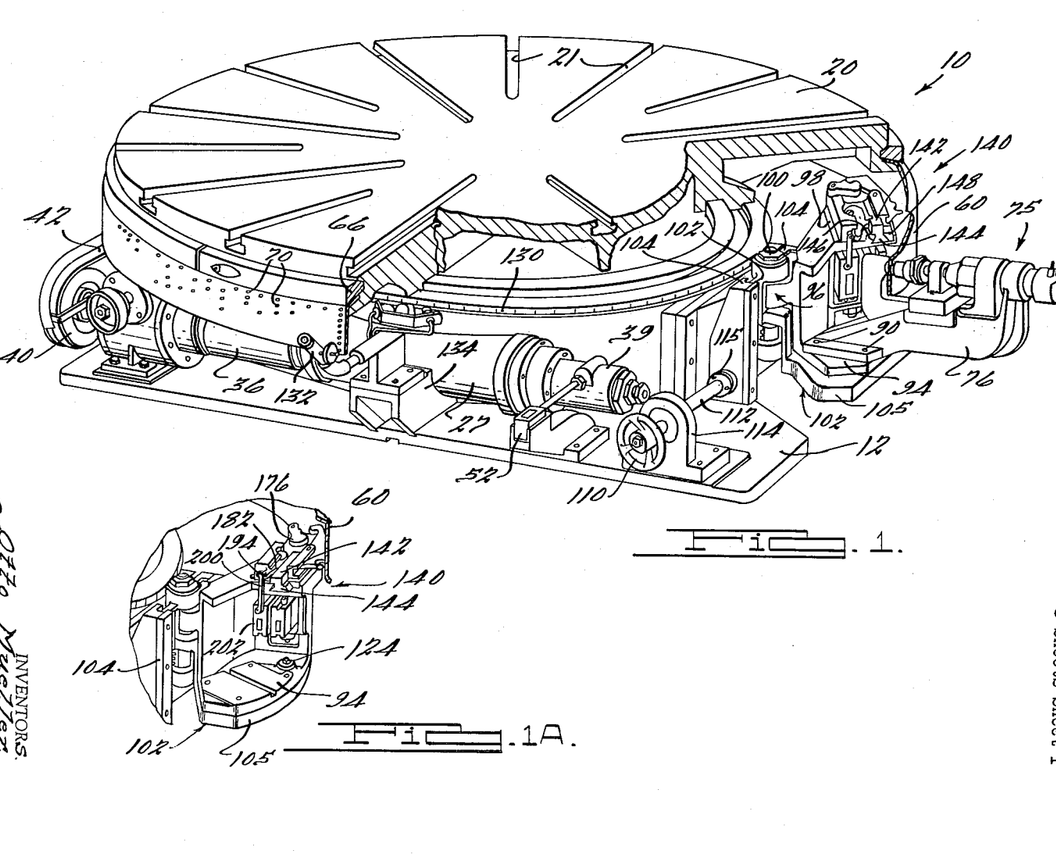
FIG. 1 is a perspective view of the indexing platform of this invention, with some parts broken away and other parts shown in section for the purpose of illustrating an aligning unit and a punching unit in the indexing platform.
FIG. 1A is a fragmentary perspective view showing the aligning unit in a moved position relative to the position illustrated for the unit in FIG. 1.

With reference to the drawing, the indexing platform of this invention, indicated generally at 10, is illustrated in FIG. 1 as including a stationary base 12 and a circular table or platform member 20 rotatably supported on the base 12. The platform member 20 has undercut locking grooves 21 for supporting workpiece carrying fixtures (not shown) in a manner which forms no part of the present invention. The base 12 carries a main bearing 14 (FIG. 4) for rotatably supporting a spindle 16 having an upright hollow axial portion 18. The platform member 20 is disposed in a horizontal position and is secured by bolts 22 to the spindle 16 for rotation therewith. A ring gear 24, secured to the spindle 16 at a position below the platform member 20, meshes with a drive worm 28 positioned within a housing 27 and carried on a drive shaft 30. The shaft 30 is supported intermediate its ends by thrust bearings 32 and is connected to the right side, as viewed in FIG. 5, of an electric clutch and brake unit 36, of conventional construction, which is in turn connected on the other side to a sleeve 38 positioned about the shaft 30. At its left end, the shaft 30 is connected to a drive pulley 40.

A belt 42 is trained about the pulley 40 and a second pulley 44 driven by what will hereinafter be referred to as a "high speed" hydraulic motor 46 for rotating the shaft 30 and, consequently, the gear 28.

A second hydraulic motor 48, supported on an adapter secured to the index speed drive and hereinafter referred to as a "slow speed" hydraulic motor, has a drive shaft 47 provided with a worm gear 49 which drives a gear 50 keyed to the sleeve 38 associated with the clutch unit 36 and positioned about the shaft 30. In an engaged position of the clutch unit 36, power is supplied to the shaft 30 from the gear 50 through the sleeve 38 and clutch unit. During driving of the shaft 30 by the motor 48, the pulley 40 is rotated by the shaft 30 and the motor 46 is in a neutral "no-pressure" position, so that it is in effect idled by the pulley 40.

At the end of the shaft 30 remote from the drive pulley 40, a counter mechanism 52 is arranged in a driven relation with a gear 54 driven by the shaft 30 for operating a counter. The purpose of the counter mechanism 52 is to indicate to the operator the approximate extent of angular movement of the platform member 20 since each unit indication on the counter mechanism 52 represents one degree of rotation of the ring gear 24.

Figure 5:
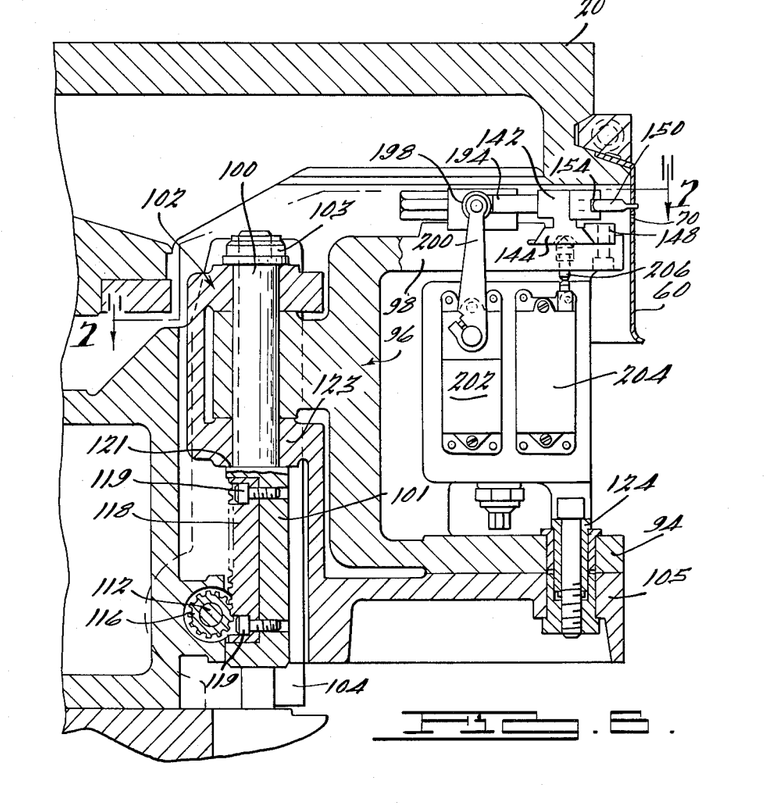
FIG. 5 is a horizontal sectional view looking along the line 5—5 in FIG. 3.

As shown in FIG. 5, the worm 28 is of the enveloping type, having a central aperture, and is formed in separate right and left sections 29 and 29a, with the section 29a secured to the shaft 30 by a key 30a. The section 29 has a frusto-conical inner surface portion 31 which is maintained in tight frictional engagement with a similarly tapered portion 33 of the shaft 30 by a nut 35 on the shaft. The nut 35 is advanced into engagement with the right terminal end of a sleeve extension 37 for the pinion section 29, the section being clamped to the right-hand thrust bearing 32 by a nut 32a. In a like manner, the section 29a is fixed to the left-hand thrust bearing 32 by a nut 32a and the sections are maintained in non-abutting relation by the bearings. On removal of a tubular housing member 39 for the terminal end of the shaft 30, and on retracting the nut 35, a hexagonal shaped end portion 41 of the sleeve extension 37 and an adjacent hexagonal shaped end portion 41a on the shaft are relatively rotatable to turn the worm section 29 relative to the worm section 29a. The right terminal end 45 of the shaft 30 is first struck to move the shaft portion 33 to the left out of tight frictional engagement with the tapered surface 31 so that the worm section 29 can be turned on the shaft. The sections 29 and 29a are thus relatively advanced to eliminate backlash with the worm gear 24 and to more accurately center the worm with the worm gear which is desirable because of their enveloped relation.

It can thus be seen that the platform member 20 may be selectively rotated by operation of the hydraulic motors 46 and 48 which, as will more clearly appear hereinafter, are operated in sequence. The high speed motor 46 operates to move the member 20 to a position near the end of its movement for achieving a predetermined position and the low speed motor 48 completes the movement. A control mechanism to be hereinafter described generally is provided for automatically starting and stopping the hydraulic motors 46 and 48 in the desired sequence and for operating the clutch unit 36 to terminate the driving operation of the motor 48.

Figure 4:
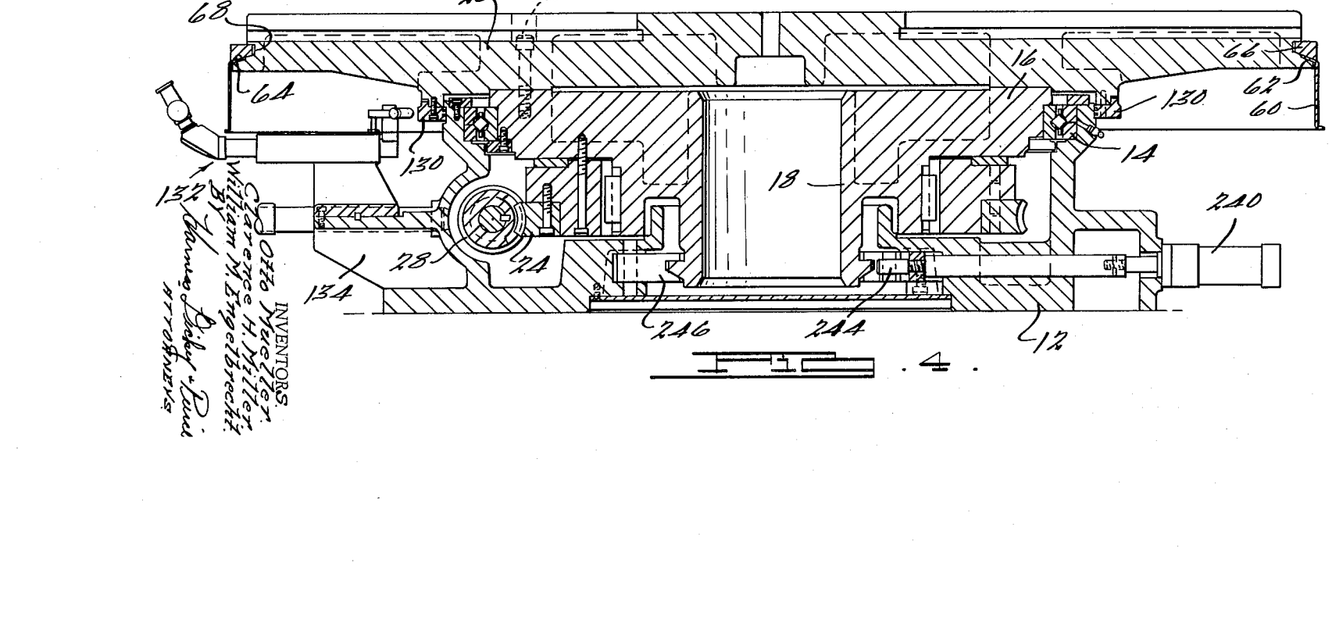
FIG. 4 is a transverse sectional view looking along the line 4—4 in FIG. 2.

As best appears in FIG. 4, an annular skirt or index member 60 is mounted on and extends downwardly from the outer periphery of the platform member 20. At its upper end, the skirt 60 has an upwardly and inwardly inclined flange 62 which is supported on a similarly inclined shoulder 64 formed on the platform member 20. An annular wedge assembly 66 fits in a groove 68 in the periphery of the member 20 and against the shoulder 64 for clamping the skirt 60 to the member 20.

Figures 10, 11:
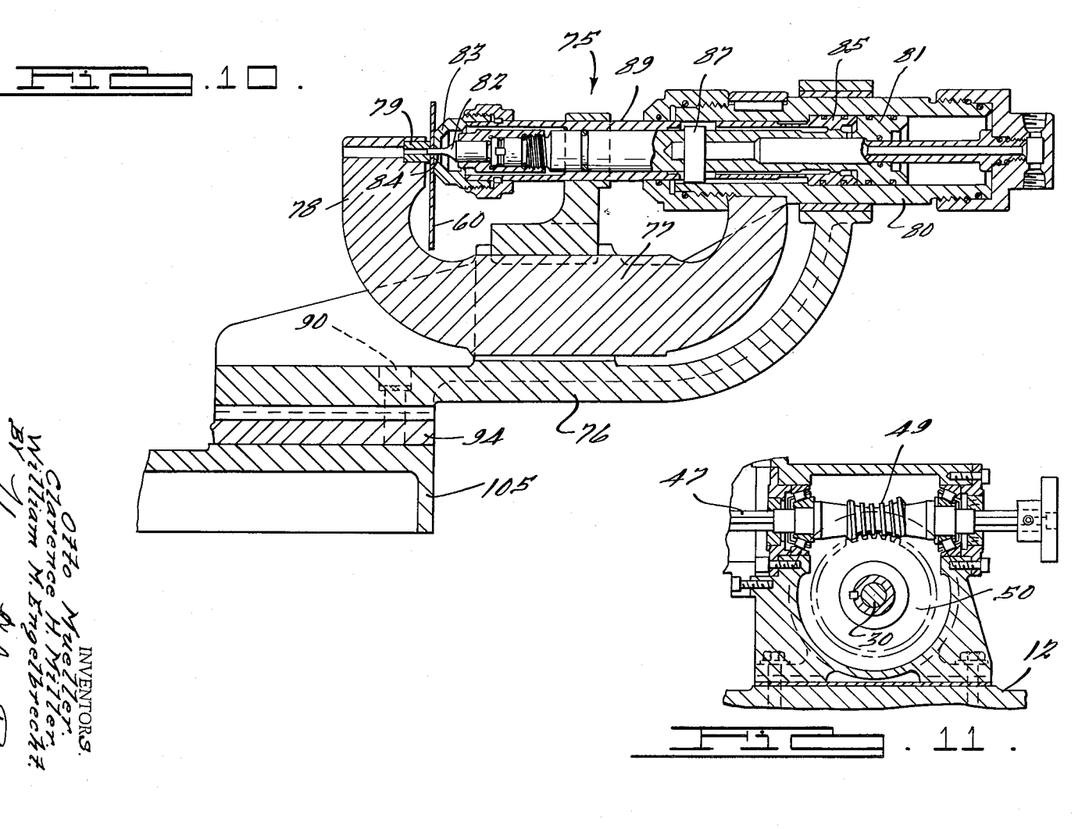
FIGS. 10 and 11 are enlarged sectional views looking along the lines 10—10 and 11—11, respectively, in FIG. 2.

The index member or skirt 60 is illustrated in FIG. 1 provided with index marks in the form of openings 70 arranged in horizontal rows as illustrated in FIG. 1. A hydraulically operated punch unit 75, of the type illustrated in Patent No. 2,586,695, is mounted on the platform unit 10 for forming the openings 70 at desired positions in the skirt 60. The punch unit 75 (FIG. 10) includes a fixture 76 which supports a yoke member 77 having an upwardly projecting end 78 which carries a punch die 79. The opposite end of the yoke 77 cooperates with an adjacent portion of the fixture 76 to support a cylinder 80 for the unit 75. On supply of fluid under pressure to the cylinder 80, a piston 81 is moved toward the left as viewed in FIG. 10 to in turn move a punch member 82 in the same direction. A pressure plate 83 arranged forwardly of the punch member 82 and having an opening 84 of a size to receive the punch member and aligned with the opening in the punch die 79 is similarly moved forwardly by the pressure of fluid trapped between the piston 81 and a second piston 85.

In the operation of the unit 75 to punch the holes 70 in the skirt 60, the punch die 79 engages one side of the skirt and the pressure plate 83 engages the opposite side. On continued supply of fluid to the cylinder 80, the piston 81 is moved toward the piston 85, with the fluid therebetween escaping through a relief valve, to force the punch member 82 through the opening 84 and the skirt 60 into the die 79. To retract the punch member 82 fluid is introduced between the pistons 81 and 85 to initially withdraw the punch member 82, after which the pressure plate 83 is retracted by the action of a key member 87 on a tubular support sleeve 89 for the pressure plate 83.

The fixture 76 in the unit 75 is secured by bolts 90 at its inner end to the lower leg 94 of a generally C-shape bracket 96 having an upper flange 98 (FIG. 1). The bracket 96 is rotatably supported on an upright pivot sleeve 100 (FIG. 6) which is in turn supported on the upper portion of an upright irregularly shaped pin 101. A nut 103 on the upper end of the pin 101 provides for a clamping of a bifurcated portion 123 of a frame 102 between the nut 103 and a shoulder 121 on the pin. The frame 102 is guided for up and down movement in an upright two-piece track structure 104 carried on the base 12 and has a lower leg portion 105 arranged in a supporting relation with the leg 94 of the bracket 96.

A hand wheel 110 is connected to a shaft 112 extending transversely of the pivot 100 and journaled in the track structure 104 and a bearing block 114 on the base 12. An upright gear 116 mounted on the shaft 112 meshes with an upright rack 118 secured by bolts 119 to a lower portion of the pin 101 so that the hand wheel 110 is operable to rotate the gear 116 to raise and lower the pin 101. The clamping of the frame portion 123 to the pin 101 provides for an up and down movement of the frame 102 with the pin 101. By virtue of the supporting relation of the frame leg portion 105 with the bracket 96 and the punch unit 75, and the support of the bracket 96 on the pivot sleeve 100, these parts are likewise movable up and down on operation of the hand wheel 110.

Spline teeth 111 (FIG. 7) on an enlarged portion of the shaft 112 positioned adjacent a part of the track structure 104 mesh with corresponding teeth 113 on a ring shape member 115 secured to the structure 104 to maintain the shaft 112 in a rotated position. In order to rotate the shaft 112, it is necessary to manually move the shaft inwardly against the pressure of a spring 117 which extends between a shoulder 119 on the shaft and the track structure 104.

Figure 7:
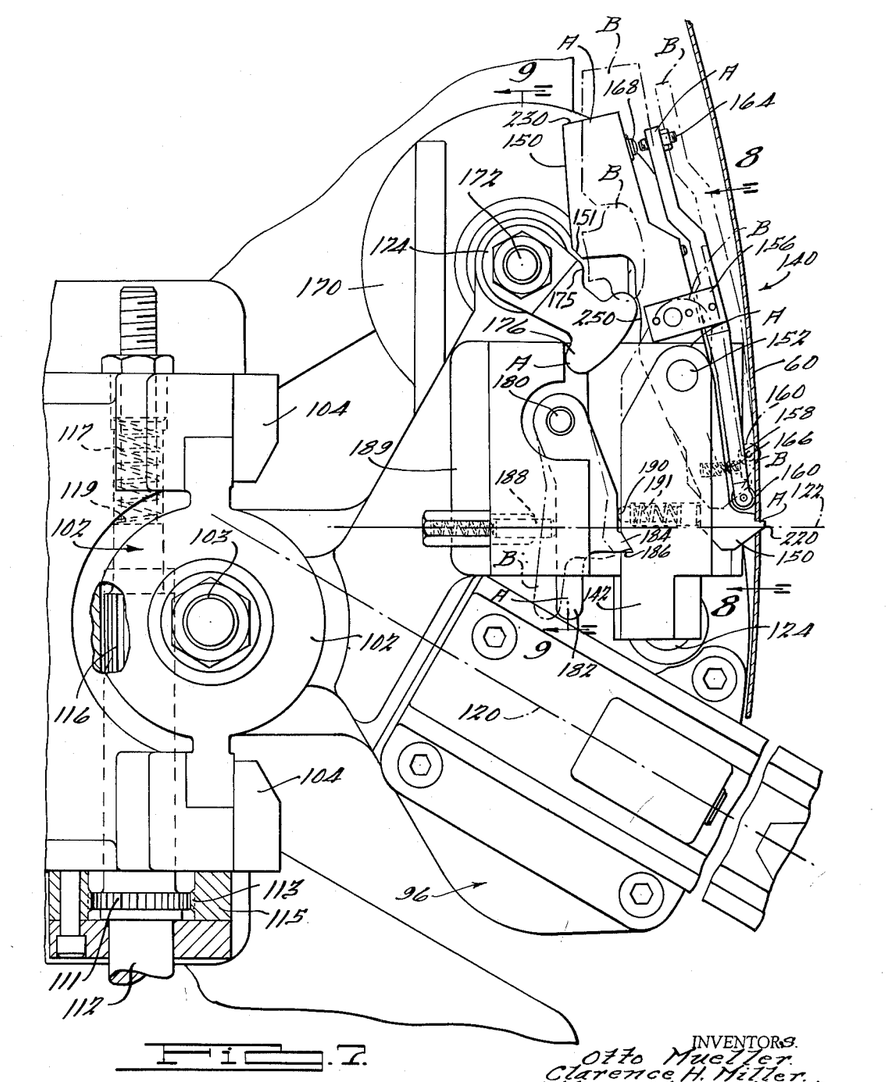
FIG. 7 is a horizontal sectional view looking along the line 7—7 in FIG. 6.

With the punch unit 75 in the position illustrated in FIG. 1, hereinafter referred to as the operative position, the punch member axis 120 (FIG. 7) is located in an imaginary plane 122 to one side of the pivot sleeve 100. As a result, when the punch 75 is operated to form an opening 70, the opening 70 is likewise located in the plane 122. As shown in FIG. 7, the bracket 96 is swingable about the pivot member 100 to an inoperative position in which the axis 120 is to one side of and at an angle relative to the plane 122. A bushing assembly 124 is mounted in the bracket leg 94, as illustrated in FIG. 6, and in the arm 105 of the housing 102 for maintaining the punch unit 75 in the inoperative position. A similar bushing in the arm 105, spaced from the first said housing therein, receives the assembly 124 to hold the punch unit 75 in the operative position. The punch unit 75 is maintained in the inoperative position during use of the indexing platform and is only moved to its operative position during setup of the machine for a particular job.

For accurately locating the openings 70, a graduated ring 130 (FIGS. 1 and 4) is secured to the underside of the platform member 20. A microscope unit 132, supported on stand 134 on the base 12 provides for a precision viewing of the ring 130. As a result, the ring 130 and the microscope 132 may be used in conjunction with the punching unit 75 to provide for a precision location of the openings 70 in the skirt 60.

During set-up, the punching unit 75 is moved to the operative position illustrated in FIG. 1 in which the axis 120 (FIG. 7) coincides with the plane 122 and a first opening 70 is punched in the ring 60 in the desired one of the possible vertical positions of the skirt 60. The platform member 20 can then be readily rotated, by use of the hydraulic motors 46 and 48 through a precise angle, by observing the ring 130 through the microscope 132, to locate the second opening 70 an exact predetermined distance from the first opening. It is apparent that this procedure can be repeated as many times as necessary to provide the desired number of rows of openings.

During use of the unit 10, the platform member 20 is stopped at positions in which the openings 70 are located in the plane 122, since the openings 70 were intially formed in the plane 122 and it is thus at this point that an accurate location of an opening is insured. The rotation of the member 20 is terminated at each opening 70 by means of an aligning unit 140 (FIGS. 1, 1a and 7) mounted on the top leg 98 for the bracket 96. The unit 140 includes an elongated slide member 142 having a downwardly and outwardly tapered base portion 144 slidably maintained within an undercut groove 146 in the leg 98 by a gib 148. As will more clearly appear hereinafter, the slide member 142 is movable between the solid and broken line positions indicated at A and B in FIG. 7.

An irregularly shaped finger member 150 is supported intermediate its ends on a pivot member 152 carried by the slide member 142. As best appears in FIGS. 6 and 7, the finger member 150 is mounted in a groove 154 in the slide member 142 and carries a strap 156 which pivotally supports an elongated bar 158. At one end, the bar 158 is provided with a roller 160 and at the opposite end with a switch actuating member 164. A spring 166 carried by the finger 150 engages the bar 158 adjacent the roller 160 for normally biasing the roller 160 in a counterclockwise direction as viewed in FIG. 7 into engagement with the inner side of the skirt 60. The roller 160 is of a size such that when positioned opposite an opening 70, the roller 160 is partially moved into the opening 70 by the spring 166 to thus rotate the bar 158 in a counterclockwise direction as viewed in FIG. 7. Such rotation of the bar 158 moves the switch actuating member 164 to a position closing a switch, indicated at 168 for a hydromotor 170 (FIG. 9).

The motor 170 operates to rotate a shaft 172 which carries an arm 174 provided on its outer end with a cam-shaped portion 176. On closing of the switch 168, the arm 174 is rotated in a clockwise direction as viewed in FIG. 7 so as to move the arm 174 from the broken line position B to the solid line position A for operating the aligning unit 140 in a manner to be presently described. Substantially all of the working parts of the aligning unit 140 are illustrated in broken and full line positions corresponding to the like positions previously described for the slide member 142 and the arm 174.

A shaft 180 carried by the bracket 96 supports a trigger member 182 at a position opposite the slide member 142. The trigger member 182 has a transversely extended projection 184 (FIG. 7) of a size to be received within a cam-shape notch 186 in the slide member 142. A spring-pressed pin 188 carried by a body member 189 mounted on the bracket 96 maintains a pressure on the trigger member 182 in the direction of the slide member 142. A spring-pressed pin 190 carried by the slide member 142 engages the trigger member 182 at one end of the pin 190 and at its opposite end engages the finger member 150. A spring 191 associated with the pin 190, urges the pin in the direction of the finger member 150.

The terminal end 194 of the trigger member 182 (FIG. 1A and 9) is positioned opposite the circular upper end portion 198 of a lever 200 pivoted at its lower end on a switch unit 202 carried by the bracket 96. A spring (not shown) associated with the lever 200 biases the lever in a clockwise direction as viewed in FIG. 6 to a position in which the lever upper end portion 198 engages one side of the trigger 182.

Figure 8:
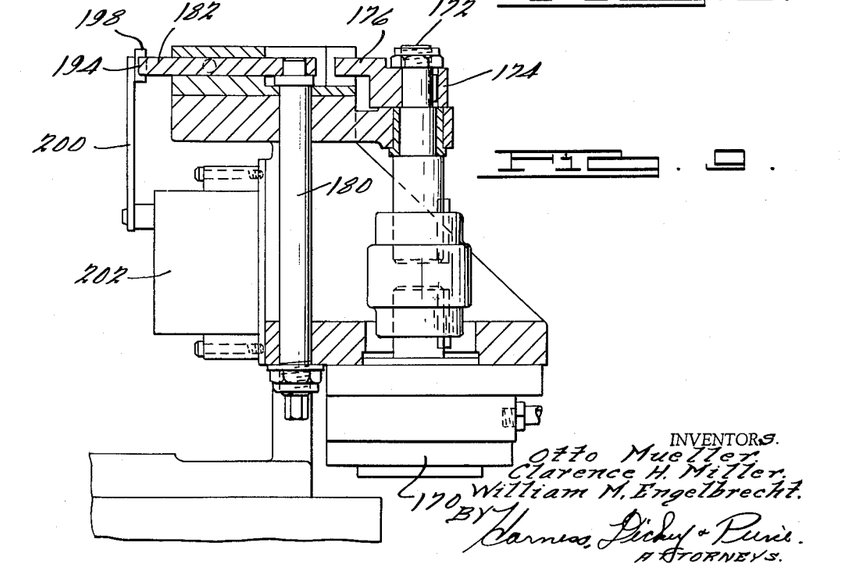

A second switch unit 204 mounted on the bracket 96 adjacent the switch unit 202 has an operating plunger 206 (FIGS. 6 and 8) extended upwardly to a position within a cavity 208 in the underside of the slide member 142, in position A of the slide member. The cavity 208 has an inclined side wall 210 which engages the plunger 206 to progressively depress the plunger and open the switch unit 204 in response to sliding movement of the slide member 142 to position B.

In operation, assume that the parts of the unit 140 are in the broken line positions indicated at B in FIG. 7 and that the platform member 20 is being rotated in a direction to move the skirt 60 clockwise as shown in FIG. 7 to index the member 20 and advance the workpieces thereon to subsequent work stations. This advanced position of the platform member 20 corresponds to a position of the skirt 60 in which the next opening 70 moving toward the plane 122 is located at the plane 122. As will more clearly appear hereinafter, in this position of the platform member a transverse projection or hook portion 220 at the free end of the finger member 150 projects through this opening 70 and the finger member 150 is in position A.

During movement of the skirt 60, the roller 160 merely rolls on the skirt 60 until the next opening 70 is positioned opposite the roller 160, at which time the bar 158 is swung in a counterclockwise direction by the spring 166 to move the roller 160 into the opening and move the switch actuating member 164 to a position closing the switch 168 and actuating the hydromotor 170 to rotate the arm 174 to the solid line position A (FIG. 7). The arm 174, in this position, is thus out of the way of the rear end portion 230 of the finger member 150. Simultaneously, the high speed fluid motor 46 will be neutralized and the index control fluid motor 48 will be activated, advancing the platform 20 at a reduced or index speed. As the platform 20 slowly advances, the hook portion 220 of finger 150 will drop into a control notch 70, causing the slide 142 to advance at said index speed until the limit switch 204 (FIG. 8) is actuated. The speed of rotation of the platform 20 will be further reduced by a hydraulic feed control which is adjustable to the most suitable operating conditions. The platform will continue to rotate at this reduced speed until the notch 70 reaches the control or stopping position. The formed portion 184 of the lever 182 will drop into the recess 186 of the slide 142. This movement will actuate the limit switch 202 and instantaneously disengage the electric clutch and engage the electric brake of the clutch brake assembly 36. This prevents the drive shaft 30 from rotating and consequently locks the platform 20 in a fixed position. A time delay relay is actuated and after a few seconds have elapsed the contacts open, causing the hydromotor 170 to reverse its motion and cause the arm 174 to move in a counterclockwise direction. This will disengage the hook portion 220 from the control band 60 and return the finger assembly to the open position B of FIG. 7. Should the slide 142 move beyond the indicated stop position, the sloping surface 151 of the finger 150 will engage a cam shoulder 175 of the arm 174 and cause the finger to rotate clockwise, withdrawing the hook portion 220 thereof from the notch 70 and prevent any damage to the mechanism because of the failure of the platform to stop at said indicated stop position.

For heavy machine operations, it might be desirable to locate the platform more securely. The operator may engage a conventional brake mechanism 244–246 provided on the axial portion 18. This brake mechanism is actuated by a hydraulic cylinder 240 into engaged and disengaged positions by a solenoid actuated valve when a push buton is pressed. After the machine operation has been completed, the table may be advanced to the next predetermined position either by the use of automatic control or by the actuation of the manually operated selector switch.

Figure 2:
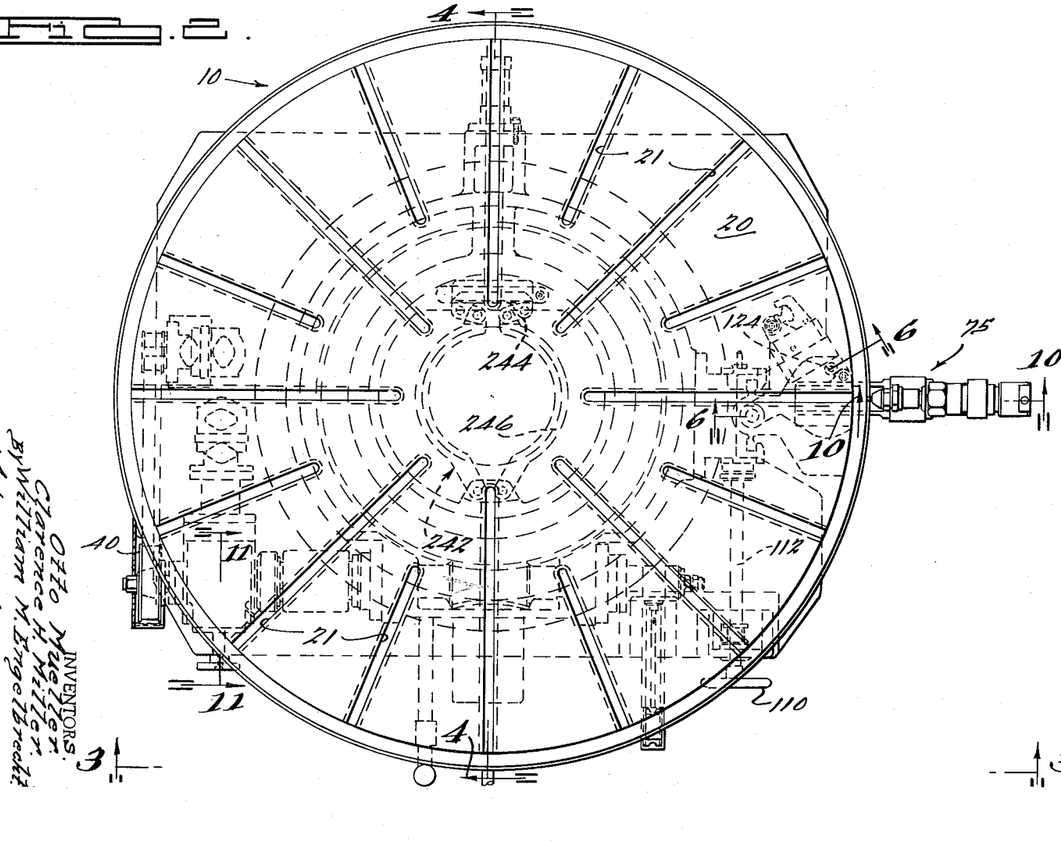
FIG. 2 is a top plan view of the indexing platform of this invention.
Figure 3:
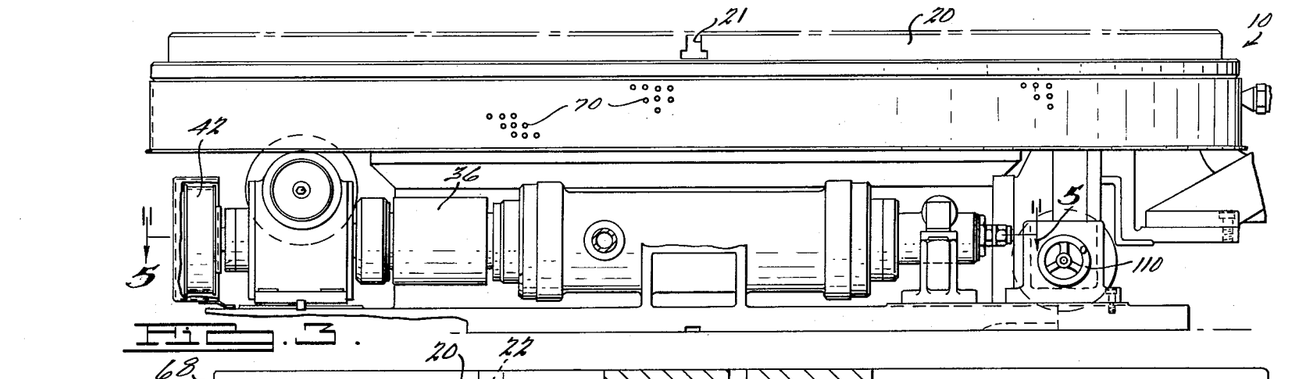
FIG. 3 is a side elevational view of the indexing platform looking substantially along the line 3—3 in FIG. 2.

Immediately upon movement of the slide member 142 from position B toward position A, the switch actuating member 206 moves into the slide member cavity 208 to provide for actuation of the switch 204 and consequent stopping of high speed motor 46 and starting of slow speed motor 48. When the slide member 142 has been pulled by the finger 150 to position A, the notch 186 in the slide member 142 is opposite the trigger projection 184, and the spring-pressed pin 188 operates to move the trigger member 182 counterclockwise as viewed in FIG. 7 to a position in which the projection 184 is in the notch 186. This movement of the trigger member 182 provides for an automatic movement of the lever 200 in a clockwise direction as viewed in FIG. 6 to in turn provide for actuation of the switch unit 202. The switch unit 202 shuts off the slow speed hydraulic motor 48 and also provides for disengagement of the clutch unit 36 and for operation of a hydraulic cylinder assembly 240 (FIGS. 2 and 4) for a brake assembly 242 operable to lock the spindle 16 in a fixed position. The brake assembly 242 is conventional and merely includes a linkage 244 operated by the cylinder assembly 240 to apply a pair of shoes 246 to the spindle 18.

As best appears in FIG. 7, the trigger member 182 which, in effect, provides for actuation of the switch unit 202 and consequent instantaneous stopping and locking of the platform member 20, moves to its actuating position at a position of the hook portion 220 and opening 70 in the plane 122. Accordingly, the opening 70 is located in exactly the same position the opening was in at the time it was formed in the skirt 60, which position is a preselected one determined by use of the microscope 132 and the calibrated ring 130.

When the platform member 20 is to be indexed to the next station, an automatic, or manual if desired, control panel provides initially for operation of the hydromotor 170 to rotate the arm 174 in a counterclockwise direction, as viewed in FIG. 7. On rotation of the arm 174, the cam-shaped end portion 176 thereof co-acts with a cam-shaped surface 250 on the trigger member 150 to both swing the trigger member 150 in a clockwise direction as viewed in FIG. 7 to retract the hook portion 220 from the opening 70 and to move the trigger member 150 from position A to position B.

In response to clockwise swinging of the trigger member 150, the trigger member moves the spring-pressed pin 190 to the left in FIG. 7 so that the pin in turn moves the trigger member 182 clockwise to withdraw the projection 184 from the notch 186 so that the slide member 142 is retracted along with the trigger member 150. Consequently, all of the working parts of the aligning unit 140 are reset automatically at the beginning of each indexing movement of the platform member 20. As a result, the unit 140 is in condition for stopping the platform member 20 at the next opening 70.

When the machine is being set up, the unit 140 is in the position illustrated in FIG. 1 to one side of the plane 122 which coincides with the axis 120 for the punching tool, as previously described.

From the above description, it is seen that this invention provides an indexing platform which operates automatically to precisely locate the platform at predetermined positions. Since a platform position controlling opening 70 is located at precisely the same position in which the opening 70 was initially formed, a precise and exact indexing operation is assured. The accuracy of the location of the platform 20 is in this position is dependent entirely on the accuracy of the calibrated ring 130 and the microscope 132. Since presently known calibrating apparatus for rings such as the ring 130 provide precision accuracy, the desired accuracy of the indexing platform 10 is insured. The counter 52 is observed for the purpose of indicating the approximate location of the platform 20 during set-up so that it is not necessary to maintain a continual microscope observation of the ring 130.

Although the invention has been described with respect to a rotatable platform, it is to be understood that it may be applied to a reciprocal platform which has stations located in an accurate manner by the openings 70 and the associated mechanism.

What is claimed is:

1. In a device for accurately indexing a workpiece in various positions to have predetermined operations performed thereon, a base, a platform movable on said base, means for moving said platform, a first element adjacent to the edges of said platform having a plurality of index means thereon, a carriage, a second element mounted on said carriage and movable into engagement with one of said plurality of index means, said second element and carriage being moved with said platform when said second element is engaged by said index means, and means actuated through the movement of said carriage to stop the movement of said platform at a predetermined location.

2. In a device for accurately indexing a workpiece in various positions to have predetermined operations performed thereon, a base, a platform movable on said base, means for moving said platform, a first element adjacent to the edge of said platform having a plurality of index means thereon, a carriage, a second element mounted on said carriage and movable into engagement with one of said plurality of index means, said second element and carriage being moved with said platform when said second element is engaged by said index means, means actuated upon the movement of the second element nto engagement with said index means for reducing the speed of movement of said platform, and means actuated upon the advancement of the carriage by said platform for interrupting the movement thereof at a predetermined location.

3. In a device for accurately indexing a workpiece in various positions to have predetermined operations performed thereon, a base, a platform movable on said base, drive means for moving said platform at a predetermined speed, an element adjacent to the edge of said platform having a plurality of openings therein, a carriage, an element containing a finger mounted on said carriage, means for moving said finger into one of said plurality of openings so as to be moved along with said carriage by said platform, means actuated upon the approach of an opening to a position adjacent to the finger for operating said moving means and causing the finger to move into said opening, means actuated upon the movement of the finger into the opening for reducing the speed of said drive means from said predetermined speed, and means actuated upon the advancement of said carriage to a predetermined position for interrupting the movement of said platform.

4. In a device for accurately indexing a workpiece in various positions to have predetermined operations performed thereon, a base, a platform movable on said base, drive means for moving said platform at a predetermined speed, an element adjacent to the edge of said platform having a plurality of openings therein, a carriage, an element containing a finger mounted on said carriage, means for moving said finger into one of sad pluralty of openings so as to be moved along with said carriage by said platform, means actuated upon the approach of an opening to a position adjacent to the finger for operating said moving means and causing the finger to move into said opening, means actuated upon the movement of the finger into the opening for reducing the speed of said drive means from said predetermined speed, means actuated upon the advancement of said carriage to a predetermined position for interrupting the movement of said platform, and safety means for disengaging the finger from said opening should the carriage move beyond said stop position.

5. In a device for accurately indexing a workpiece in various positions to have predetermined operations performed thereon, a base, a platform movable on said base, drive means for moving said platform at a predetermined speed, an element adjacent to the edge of said platform having a plurality of openings therein, a carriage, an element containing a finger mounted on said carriage, means for moving said finger into one of said plurality of openings so as to be moved along with said carriage by said platform, means actuated upon the approach of an opening to a position adjacent to the finger for operating said moving means and causing the finger to move into said opening, means actuated upon the movement of the finger into the opening for reducing the speed of said drive means from said predetermined speed, means actuated upon the advancement of said carriage to a predetermined position for interrupting the movement of said platform, safety means for disengaging the finger from said opening should the carriage move beyond said stop position, and means upon the stopping of the carriage for retracting said finger from the opening and returning the carriage to its initial position.

6. In a device for accurately indexing a workpiece in various positions to have predetermined operations performed thereon, a base, a platform movable on said base, means for moving said platform and having a plurality of stop locating means thereon, an element movable into interlocking engagement with an adjacent locating means, means sensing the proximity of said locating means to said element as the platform is moved for causing said engagement during said movement and the movement of sad element with said platform, and means for stopping said platform and element upon a predetermined amount of advancement of said element.

7. In a device for accurately indexing a workpiece in various positions to have predetermined operations performed thereon, a base, a rotatable platform on said base having a plurality of stop locating means thereon, means for rotating said platform, an element movable into interlocking engagement with an adjacent locating means, means sensing the proximity of said locating means to said element as the platform is rotated for causing said engagement during said rotation and the movement of said element with said platform, and means for stopping said platform and element upon a predetermined degree of advancement of said element.

8. In a device for accurately indexing a workpiece in various positions to have predetermined operations performed thereon, a base, a rotatable platform on said base having a plurality of stop locating means thereon, means for rotating said platform, an element movable into interlocking engagement with an adjacent locating means, means sensing the proximity of said locating means to said element as the platform is rotated for causing said engagement during said rotation and the movement of said element with said platform, means for stopping said platform and element upon a predetermined degree of advancement of said element, means adjacent to said element containing the locating means having a precision scale thereon, and telescope means for reading said scale for accurately checking the work during or after the machining thereof.

9. In a device for accurately indexing a workpiece in various positions to have predetermined operations performed thereon, a base, a rotatable platform on said base, means for rotating said platform, a skirt depending from said platform outwardly from the center of rotation of said platform and having a plurality of openings therein, a movable carriage, means on said carriage projectable into one of said openings for connecting the carriage to said skirt for movement with the platform, means sensing the proximity of an opening to said projectable means for causing said last means to enter said opening, means actuated by the advancement of said carriage for reducing the speed of said driving means, and means thereafter for further reducing the speed of said driving means and stopping said carriage.

10. In a device for accurately indexing a workpiece in various positions to have predetermined operations performed thereon, a base, a rotatable platform on said base, means for rotating said platform, a skirt depending from said platform outwardly from the center of rotation of said platform and having a plurality of openings therein, a movable carriage, means on said carriage projectable into one of said openings for connecting the carriage to said skirt for movement with the platform, a clutch and brake means through which said driving means operates, and means upon a predetermined advancement of said carriage for disconnecting the clutch means and applying the brake for stopping the carriage independent of the movement of said driving means.

11. In a device for accurately indexing a workpiece in various positions to have predetermined operations performed thereon, a base, a rotatable platform on said base, means for rotating said platform, a skirt depending from said platform outwardly from the center of rotation of said platform and having a plurality of openings therein, a movable carriage, means on said carriage projectable into one of said openings for connecting the carriage to said skirt for movement with the platform, a clutch and brake means through which said driving means operates, means upon a predetermined advancement of said carriage for disconnecting the clutch means and applying the brake for stopping the carriage independent of the movement of said driving means, and means for releasing said projectable means from said skirt and returning the carriage to its initial position.

12. In a device for accurately indexing a workpiece in various positions to have predetermined operations performed thereon, a base, a rotatable platform on said base, means for rotating said platform, a skirt depending from said platform outwardly from the center of rotation of said platform and having a plurality of openings therein, a movable carriage, means on said carriage projectable into one of said openings for connecting the carriage to said skirt for movement with the platform, a clutch and brake means through which said driving means operates, means upon a predetermined advancement of said carriage for disconnecting the clutch means and applying the brake for stopping the carriage independent of the movement of said driving means, and means for withdrawing said projectable means from said opening should the carriage accidentally move beyond its intended stop position.

13. In a device for accurately indexing a workpiece in various positions to have predetermined operations performed thereon, a base, a rotatable platform on said base, means for rotating said platform, a skirt depending from said platform outwardly from the center of rotation of said platform and having a plurality of openings therein, a movable carriage, means on said carriage projectable into one of said openings for connecting the carriage to said skirt for movement with the platform, a clutch and brake means through which said driving means operates, means upon a predetermined advancement of said carriage for disconnecting the clutch means and applying the brake for stopping the carriage independent of the movement of said driving means, a precision scale provided on said platform in synchronized relation to the openings of said skirt, and a telescope on said base focused on said scale for checking the position of said platform in any of its rotative positions.

14. In a device for accurately indexing a workpiece in various positions to have predetermined operations performed thereon, a base, a rotatable platform on said base, means for rotating said platform, a skirt depending from said platform outwardly from the center of rotation of said platform and having a plurality of openings therein, a movable carriage, means on said carriage projectable into one of said openings for connecting the carriage to said skirt for movement with the platform, a clutch and brake means through which said driving means operates, means upon a predetermined advancement of said carriage for disconnecting the clutch means and applying the brake for stopping the carriage independent of the movement of said driving means, a precision scale provided on said platform in synchronized relation to the openings of said skirt, a telescope on said base focused on said scale for checking the position of said platform in any of its rotative positions, and manual means for operating the drive means in small increments located in position to be actuated by an operator viewing the scale through the telescope means.

15. In a device for accurately indexing a workpiece in various positions to have predetermined operations performed thereon, a base, a platform movable on said base, means for moving said platform, a first element adjacent to the edge of said platform having a plurality of index means thereon, a carriage, a second element mounted on said carriage and movable into engagement with one of said plurality of index means, said second element and carriage being moved with said platform when said second element is engaged by said index means, means actuated through the movement of said carriage to stop the movement of said platform at a predetermined location, means on the platform having a precision scale thereon synchronized with said index means, and telescope means for reading said scale for accurately checking the position of the platform and the accurate location of the work operation performed on the workpiece.

16. In a device for accurately indexing a workpiece in various positions to have predetermined operations performed thereon, a base, a platform rotatably supported on said base, means for driving said platform at a high speed, intermediate speed, and a positioning speed, means on the platform having stop indicating means thereon, a carriage on said base, means supported on said carriage for engagement with said indicating means for causing said carriage to advance with said platform, and means actuated by the advancement of said platform for reducing the speed of the platform and accurately stopping the platform upon the carriage reaching a predetermined position.

17. In a device for accurately indexing a workpiece in various positions to have predetermined operations performed thereon, a base, a platform rotatably supported on said base, means for driving said platform at a high speed, intermediate speed, and a positioning speed, means on the platform having stop indicating means thereon, a carriage on said base, means supported on said carriage for engagement with said indicating means for causing said carriage to advance with said platform, means actuated by the advancement of said platform for reducing the speed of the platform and accurately stopping the platform upon the carriage reaching a predetermined position, and means for releasing said engaging means should the carriage move beyond said predetermined position.

18. In a device for accurately indexing a workpiece in various positions to have predetermined operations performed thereon, a base, a platform rotatably supported on said base, means for driving said platform at a high speed, intermediate speed, and a positioning speed, means on the platform having stop indicating means thereon, a carriage on said base, means supported on said carriage for engagement with said indicating means for causing said carriage to advance with said platform, means actuated by the advancement of said platform for reducing the speed of the platform and accurately stopping the platform upon the carriage reaching a predetermined position, brake means between said drive means and said platform, and means upon the advancement of the carriage to a predetermined position for reducing the drive speed to intermediate speed and for thereafter reducing the speed to positioning speed and applying the brake to stop said platform.

19. In a device for accurately indexing a workpiece in various positions to have predetermined operations performed thereon, a base, a platform rotatably supported on said base, means for driving said platform at a high speed, intermediate speed, and a positioning speed, means on the platform having stop indicating means thereon, a carriage on said base, means supported on said carriage for engagement with said indicating means for causing said carriage to advance with said platform, means actuated by the advancement of said platform for reducing the speed of the platform and accurately stopping the platform upon the carriage reaching a predetermined position, a precision scale on said platform synchronized with said indicating means thereon, and a telescope for reading said scale when in any one of a plurality of stop positions for checking said work and the accuracy of said platform.

20. In a device for accurately indexing a workpiece in various positions to have predetermined operations performed thereon, a base, a platform rotatably supported on said base, means for driving said platform at a high speed, intermediate speed, and a positioning speed, means on the platform having stop indicating means thereon, a carriage on said base, means supported on said carriage for engagement with said indicating means for causing said carriage to advance with said platform, means actuated by the advancement of said platform for reducing the speed of the platform and accurately stopping the platform upon the carriage reaching a predetermined position, a precision scale on said platform synchronized with said indicating means thereon, a telescope for reading said scale when in any one of a plurality of stop positions for checking said work and the accuracy of said platform, and manually actuatable means on said drive means for permitting the manual movement of said platform for checking purposes.

References Cited in the file of this patent

UNITED STATES PATENTS

| | | |
|---|---|---|
| 2,273,784 | Kahl | Feb. 17, 1942 |
| 2,330,968 | Groene et al. | Oct. 5, 1943 |
| 2,396,139 | Walter | Mar. 5, 1946 |
| 2,443,278 | Stratton | June 15, 1948 |
| 2,452,089 | Wiken et al. | Oct. 26, 1948 |
| 2,477,137 | Mihalek | July 26, 1949 |
| 2,481,383 | Bickel et al. | Sept. 6, 1949 |
| 2,645,981 | Hirvonen | July 21, 1953 |
| 2,688,904 | Richter | Sept. 14, 1954 |
| 2,796,776 | Locke et al. | June 25, 1957 |
| 2,921,376 | Miller | Jan. 19, 1960 |

UNITED STATES PATENT OFFICE
CERTIFICATE OF CORRECTION

Patent No. 3,026,746                        March 27, 1962

Otto Mueller et al.

It is hereby certified that error appears in the above numbered patent requiring correction and that the said Letters Patent should read as corrected below.

Column 5, lines 5 and 6, for "countercloswise" read -- counterclockwise --; column 7, line 38, strike out "is", first occurrence; line 58, for "edges" read -- edge --; column 8, line 2, for "nto" read -- into --.

Signed and sealed this 28th day of August 1962.

(SEAL)
Attest:

ESTON G. JOHNSON                        DAVID L. LADD Attesting Officer                          Commissioner of Patents